United States Patent
Zhao

(10) Patent No.: US 11,972,523 B2
(45) Date of Patent: Apr. 30, 2024

(54) GRID MAP GENERATION METHOD AND DEVICE, AND COMPUTER-READABLE STORAGE MEDIUM

(71) Applicant: CLOUDMINDS ROBOTICS CO., LTD., Shanghai (CN)

(72) Inventor: Fang Zhao, Shanghai (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 272 days.

(21) Appl. No.: 17/563,732

(22) Filed: Dec. 28, 2021

(65) Prior Publication Data

US 2022/0122321 A1 Apr. 21, 2022

Related U.S. Application Data

(63) Continuation of application No. PCT/CN2021/099338, filed on Jun. 10, 2021.

(30) Foreign Application Priority Data

Jun. 12, 2020 (CN) .......................... 202010538044.5

(51) Int. Cl.
*G06T 17/05* (2011.01)
*G06T 7/00* (2017.01)
(Continued)

(52) U.S. Cl.
CPC ................ *G06T 17/05* (2013.01); *G06T 7/11* (2017.01); *G06T 7/136* (2017.01); *G06T 7/97* (2017.01); *G06T 2207/20081* (2013.01)

(58) Field of Classification Search
None
See application file for complete search history.

(56) References Cited

U.S. PATENT DOCUMENTS 10,354,150 B2 7/2019 Yamazaki et al.
2018/0306587 A1 10/2018 Holz

FOREIGN PATENT DOCUMENTS

CN 106997614 A 8/2017
CN 108920584 A 11/2018
(Continued)

OTHER PUBLICATIONS

CloudMinds Robotics Co., Ltd., International Seach Report, PCT/CN2021/099338, dated Sep. 8, 2021, 4 pgs.
(Continued)

*Primary Examiner* — Robert J Craddock
(74) *Attorney, Agent, or Firm* — Heslin Rothenberg Farley & Mesiti P.C.; Nicholas Mesiti

(57) ABSTRACT

The embodiments of the present disclosure relate to the field of communication technology, and disclose a grid map generation method and device, and a computer-readable storage medium. The grid map generation method includes: acquiring original image data of an original image photographed by a photographing device and pose data of the photographing device when photographing the original image; inputting the original image data and the pose data into a preset learning model to obtain first image data, wherein the preset learning model performs a first dynamic object filtering on the original image data according to the pose data to obtain the first image data; fusing the first image data and the pose data into the preset learning model to obtain a fusion learning model; and obtaining a grid map of the original image data according to the fusion learning model and the pose data.

20 Claims, 4 Drawing Sheets

(51) Int. Cl.
  *G06T 7/11*    (2017.01)
  *G06T 7/136*   (2017.01)

(56)  References Cited

FOREIGN PATENT DOCUMENTS

| | | |
|---|---|---|
| CN | 109387204 A | 2/2019 |
| CN | 109389641 A | 2/2019 |
| CN | 109558471 A | 4/2019 |
| CN | 109895100 A | 6/2019 |
| CN | 110118554 A | 8/2019 |
| CN | 110260856 A | 9/2019 |
| CN | 110310362 A | 10/2019 |
| CN | 110335316 A | 10/2019 |
| CN | 110490900 A | 11/2019 |
| CN | 110501017 A | 11/2019 |
| CN | 110967011 A | 4/2020 |
| CN | 111123949 A | 5/2020 |
| CN | 111239761 A | 6/2020 |
| CN | 111683203 A | 9/2020 |
| JP | 2019532369 A | 11/2019 |
| WO | 9811465 A1 | 3/1998 |

OTHER PUBLICATIONS

Changqing Hu, et al.,"Indoor Mapping and Navigation Based on Three-wheeled Omnidirectional Robot", Practical Electronics, May 31, 2019, 4 pgs.
Achim Lilienthal, et al., "Greating Gas Concentration Gridmaps with a Mobile Robot", Proceedings 2003 IEEE/RSJ International Conference on Intelligent Robots and Systems, Oct. 31, 2003, 6 pgs.
CloudMinds Robotics Co., Ltd., Request for the Submission of an Opinion with English Translation, KR 10-2021-7042773, Jan. 28, 2024, 10 pgs.

GRID MAP GENERATION METHOD AND DEVICE, AND COMPUTER-READABLE STORAGE MEDIUM

CROSS REFERENCE TO RELATED APPLICATIONS

The present application is a continuation of PCT Patent Application No. PCT/CN2021/099338, filed Jun. 10, 2021, which claims priority of Chinese patent application No. 2020105380445, filed on Jun. 12, 2020, each of which is incorporated by reference herein in its entirety.

TECHNICAL FIELD

The embodiments of the present disclosure relate to the field of communication technology, in particular to a grid map generation method and device, and a computer-readable storage medium.

BACKGROUND

With the rapid development of computer technology, sensor technology and robot technology, robot autonomous navigation technology has also made great progress. For a motion navigation of a robot, the most important thing is to establish a globally available grid map for the robot in advance to realize the motion planning and navigation. At present, most of commercial robots adopt lidar in cooperation with wheel odometer to realize a global map reconstruction and a grid map generation.

The inventor has found that there are at least the following problems in the existing technology. For some low-cost robots, the lidar and the wheel odometer are expensive, which is not conducive to the streamlined production of robots. Besides, it is difficult to generate a grid map that can be used for navigation by replacing the lidar and the wheel odometer with other inexpensive devices.

SUMMARY

Some embodiments of the present disclosure provide a grid map generation method and device, and a computer-readable storage medium, which can reduce the generation cost of the grid map while generating an obstacle-free grid map.

In order to solve the above technical problems, some embodiments of the present disclosure provide a grid map generation method, including: acquiring original image data of an original image photographed by a photographing device and pose data of the photographing device when photographing the original image; inputting the original image data and the pose data into a preset learning model to obtain first image data, where the preset learning model performs first dynamic object filtering on the original image data according to the pose data, so as to obtain the first image data; fusing the first image data and the pose data into the preset learning model to obtain a fusion learning model; and obtaining a grid map of the original image data according to the fusion learning model and the pose data.

Some embodiments of the present disclosure further provide a grid map generation device, including: at least one processor; and a memory communicatively connected with the at least one processor; where the memory stores instructions executable by the at least one processor, and the instructions are executed by the at least one processor to cause the at least one processor to implement the grid map generation method described above.

Some embodiments of the present disclosure further provide a computer-readable storage medium storing a computer program which, when executed by the processor, implements the grid map generation method described above.

Compared with the existing technology, by acquiring the original image data of the original image photographed by the photographing device and the pose data of the photographing device when photographing the original image, the embodiments of the present disclosure may reconstruct the map based on a truncated signed distance function (TSDF) model (that is, the preset learning model, herein, the preset learning model may also be other models), according to the acquired pose data and the original image data (the TSDF can adapt to different resolutions and has ability of noise filtering). In the process of generating the grid map, the first image data is obtained by inputting the original image data and the pose data into the preset learning model. Since the preset learning model may performs the first dynamic object filtering on the original image data according to the pose data, the impact of a dynamic object on a finally generated result is reduced. Finally, the first image data and the pose data are fused into the preset learning model to obtain the fusion learning model, and the grid map of the original image data is obtained according to the fusion learning model and the pose data, so that the grid map available for navigation is quickly generated. Since the cost of the photographing device for acquiring the original image and a device for acquiring the pose data (such as a pose sensor) is low, the cost for the grid map generation can be reduced while generating an obstacle-free grid map.

For example, after obtaining the fusion learning model, the method further includes: acquiring a common view frame of the original image data from a pose database according to the pose data, where the pose database stores historical pose data of the photographing device when photographing historical images; constructing a local 3D grid map according to the common view frame and the fusion learning model; performing a second dynamic object filtering on the first image data according to the local 3D grid map to obtain second image data; updating the fusion learning model according to the second image data to obtain a global learning model; and obtaining the grid map of the original image data according to the fusion learning model and the pose data includes: obtaining the grid map of the original image data according to the global learning model and the pose data.

For example, acquiring the common view frame of the original image data from the pose database according to the pose data includes: determining whether there is historical pose data in the pose database having a deviation from the pose data within a preset range; and in response to determining that there is historical pose data in the pose database having the deviation from the pose data within the preset range, using historical image data corresponding to the historical pose data as the common view frame.

For example, constructing the local 3D grid map according to the common view frame and the fusion learning model includes: generating a 3D local obstacle map and an obstacle-free map according to the common view frame and the fusion learning model; and constructing the local 3D grid map according to the 3D local obstacle map and the obstacle-free map.

For example, performing the second dynamic object filtering on the first image data according to the local 3D grid map to obtain the second image data includes: determining if, among the first image data, there is an object in the 3D local obstacle map but not in the obstacle-free map; and in response to determining that among the first image data, there is an object in the 3D local obstacle map but not in the obstacle-free map, updating the obstacle-free map, and performing the second dynamic object filtering on the first image data according to an updated obstacle-free map to obtain the second image data.

For example, obtaining the grid map of the original image data according to the fusion learning model and the pose data includes: obtaining a 2D occupancy obstacle map and a 2D obstacle-free map according to the common view frame; and setting all points having obstacles in the 2D occupancy obstacle map to 0, and setting points greater than a preset threshold in the 2D obstacle-free map to 1, so as to obtain the grid map.

For example, the preset learning model performing the first dynamic object filtering on the original image data according to the pose data includes: for each point in the original image data, acquiring a difference between a SDF value of the point and an original SDF value of a corresponding point stored in the preset learning model; binarizing the differences of all points in the original image data to obtain a first mask image; and performing the first dynamic object filtering on the original image data according to the first mask image to obtain the first image data.

For example, after obtaining a binarized mask image, the method further includes: performing reddish filling on the original image data and the first mask image to obtain a second mask image; and performing the first dynamic object filtering on the original image data according to the first mask image to obtain the first image data includes: performing the first dynamic object filtering on the original image data according to the second mask image to obtain the first image data.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a limitation in proportion unless otherwise stated.

DETAILED DESCRIPTION

The embodiments of the present disclosure will be described in detail below with reference to the accompanying drawings in order to make the objectives, technical solutions and advantages of the present disclosure clearer. However, it will be apparent to those skilled in the art that, in the various embodiments of the present disclosure, numerous technical details are set forth in order to provide the reader with a better understanding of the present disclosure. However, without these technical details, the technical solutions claimed in the present disclosure may also be implemented based on various changes and modifications of the following embodiments.

Figure 1:
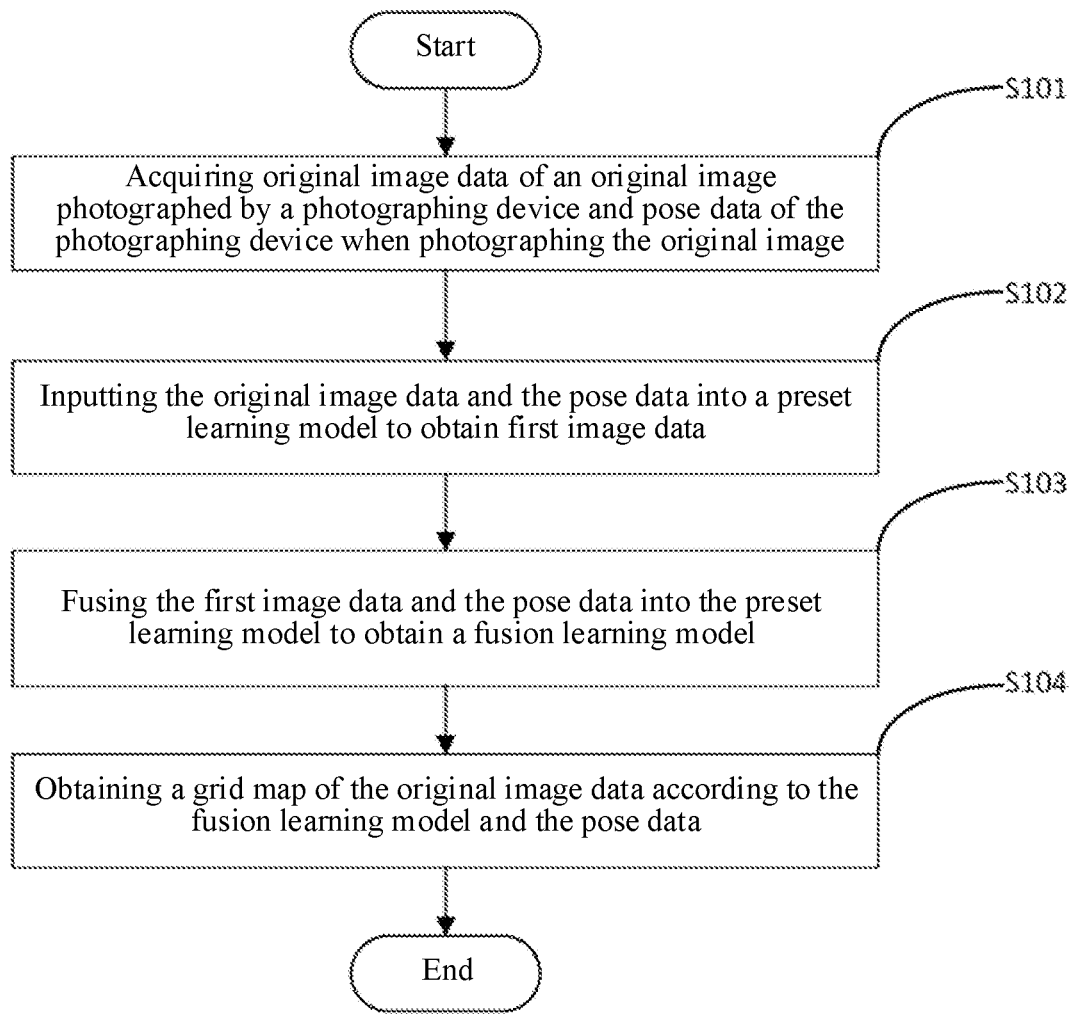
FIG. 1 is a flowchart of a grid map generation method according to a first embodiment of the present disclosure.

A first embodiment of the present disclosure relates to a grid map generation method. The specific flow is shown in FIG. 1, which includes the following steps.

In S101, original image data of an original image photographed by a photographing device and pose data of the photographing device when photographing the original image.

Specifically, in this embodiment, the original image may be photographed by a RGB-D camera, and the pose data of a pose of the RGB-D camera when photographing the original image may be obtained by an inertial measurement unit (IMU). The IMU is a device for measuring a triaxial attitude angle (or angular velocity) and an acceleration of an object. The pose data includes an angular velocity and an acceleration of the RGB-D camera in a three-dimensional space. An attitude of the object may be calculated according to the pose.

It should be noted that both the RGB-D camera and the inertial measurement unit may be installed on a robot, so as to provide more reliable data for generation of a grid map in the following. It can be understood that this embodiment does not specifically limit the device for acquiring the original image data and the pose data, and different devices may be selected and installed on the robot for acquiring the original image data and the pose data according to actual requirements.

In S102, the original image data and the pose data are input into a preset learning model to obtain first image data.

Specifically, the preset learning model in this embodiment is preferably a TSDF model (TSDF may adapt to different resolutions and has an ability of noise filtering). The TSDF model may perform first dynamic object filtering on the original image data according to the pose data so as to obtain the first image data.

It should be noted that in this embodiment, the preset learning model performing the first dynamic object filtering on the original image data according to the pose data may include: acquiring a difference between a SDF value of each point in the original image data and an original SDF value of a corresponding point stored in the preset learning model; binarizing the difference to obtain a first mask image; and performing the first dynamic object filtering on the original image data according to the first mask image to obtain the first image data. Specifically, the TSDF model itself stores a sign distance function (SDF): $SDF(x)=z(x)-D(u)$, where u represents a pixel point of an image and X represents a 3D coordinate point in the TSDF model corresponding to u. If there is a dynamic object in the original image, the SDF value of the original image data differs greatly from a SDF value stored in a corresponding point in the TSDF model. Therefore, a difference between the two SDF values may be used to construct an original mask image of the dynamic object. The formula expressed as $M(D)=SDF(D)-SDF'(D)$ may be adopted, where M(D) is the difference, SDF(D) is the original SDF value stored in the corresponding point in the TSDF model, and SDF'(D) is the SDF value of the pixel point in the original image data. After obtaining the original mask image, in order to make the image more accurate, the original mask image may be binarized to obtain the first mask image, where a binarization threshold is expressed as $t=\gamma\tau^2$. It shall be understood that the binarization threshold in this embodiment may be set according to actual requirements, which will not be specifically limited herein.

Preferably, in order to further improve image accuracy and ensure that 2D dynamic objects in the original image data can be accurately filtered out, in this embodiment, a reddish filling is performed on the original image data and the first mask image after obtaining the first mask image, so as to obtain a second mask image; and then the first dynamic object filtering is performed on the original image data according to the second mask image to obtain the first image data. Specifically, the original image data and the first mask image are firstly divided into a plurality of regions, and then for each of the regions, starting from a pixel in the region, the coloring is extended to the surrounding pixels until all pixels in the closed region are filled with new colors. As the color filled in a region is different from the colors filled in other regions, it is possible to determine which region needs to be cleared by using the colors.

In S103, the first image data and the pose data are fused into the preset learning model to obtain a fusion learning model.

In S104, a grid map of the original image data is obtained according to the fusion learning model and the pose data.

With regard to operation S103 to operation S104, specifically, in this embodiment, a 2D grid map for robot navigation and motion planning can be obtained according to the fusion learning model and the pose data by using a two-dimensional algorithm version of integer chase. The specific implementation is described in detail in a second embodiment as described in the following, which will not be repeated herein.

Compared with the existing technology, by acquiring the original image data of the original image photographed by the photographing device and the pose data of the photographing device when photographing the original image, the embodiments of the present disclosure may reconstruct the map based on a truncated signed distance function (TSDF) model (that is, the preset learning model, herein, the preset learning model may also be other models), according to the acquired pose data and the original image data (the TSDF can adapt to different resolutions and has ability of noise filtering). In the process of generating the grid map, the first image data is obtained by inputting the original image data and the pose data into the preset learning model. Since the preset learning model may performs the first dynamic object filtering on the original image data according to the pose data, the impact of a dynamic object on a finally generated result is reduced. Finally, the first image data and the pose data are fused into the preset learning model to obtain the fusion learning model, and the grid map of the original image data is obtained according to the fusion learning model and the pose data, so that the grid map available for navigation is quickly generated. Since the cost of the photographing device for acquiring the original image and a device for acquiring the pose data (such as a pose sensor) is low, the cost for the grid map generation can be reduced while generating an obstacle-free grid map.

A second embodiment of the present disclosure relates to a grid map generation method, which is further improved on the basis of the first embodiment. The specific improvement lies in that in this embodiment, a second dynamic object filtering is performed on the first image data again to obtain second image data, and a grid map of original image data is obtained according to the second image data, so that a more accurate grid map can be generated and the reliability of the grid map generation method can be improved.

Figure 2:
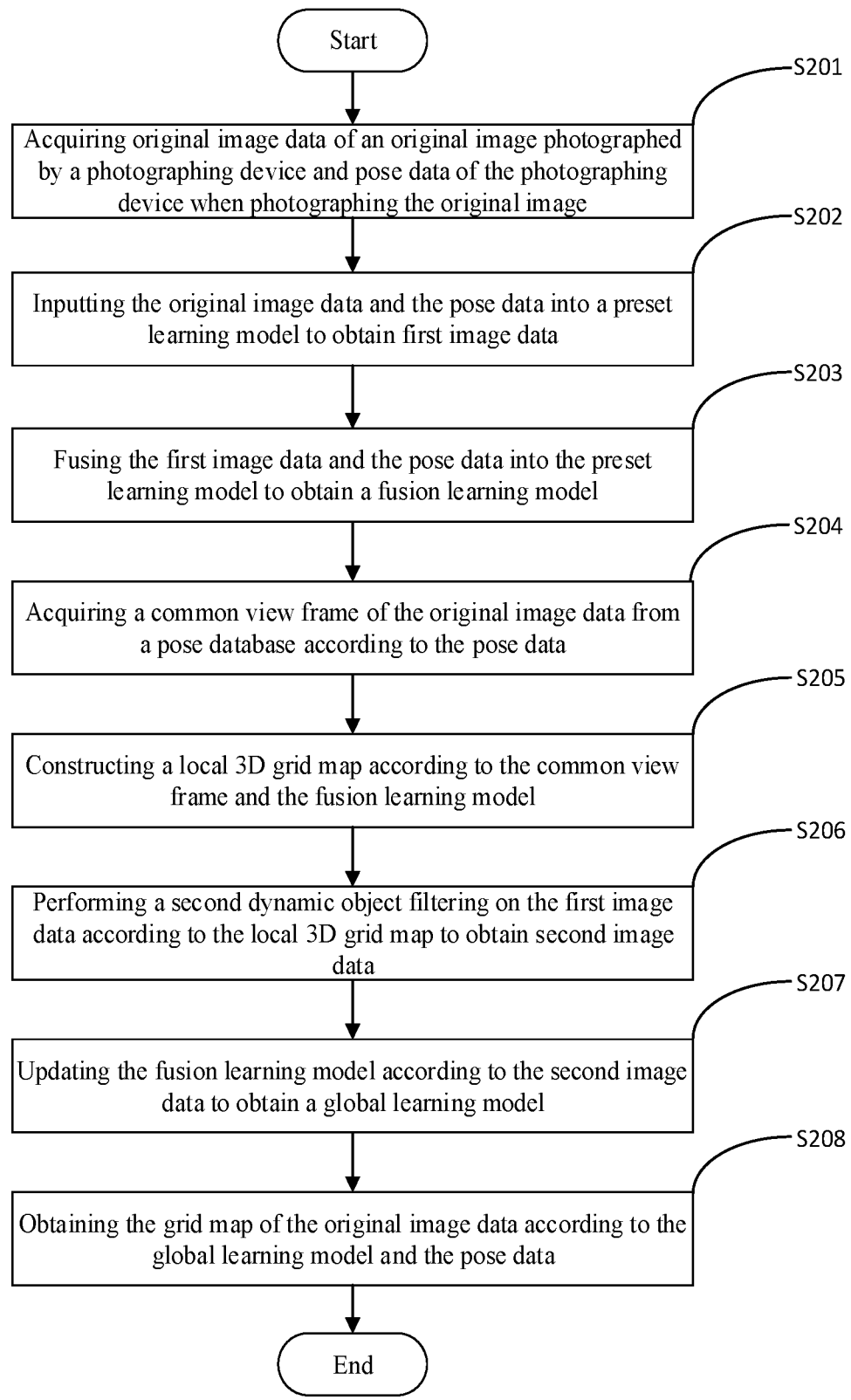
FIG. 2 is a flowchart of a grid map generation method according to a second embodiment of the present disclosure.

The specific flow of this embodiment is shown in FIG. 2, which includes the following operations.

In S201, original image data of an original image photographed by a photographing device and pose data of the photographing device when photographing the original image are acquired.

In S202, the original image data and the pose data are input into a preset learning model to obtain first image data.

In S203, the first image data and the pose data are fused into the preset learning model to obtain a fusion learning model.

Operations S201 to S203 in this embodiment are similar to operations S101 to S103 in the first embodiment, which will not be repeated herein to avoid repetition.

In S204, a common view frame of the original image data is acquired from a pose database according to the pose data.

Specifically, it is determined whether there is historical pose data stored in the pose database having a deviation from the pose data within a preset range. In response to determining that there is the historical pose data stored in the pose database having the deviation from the pose data within the preset range, historical image data corresponding to the historical pose data is used as a common view frame. It can be understood that the pose data includes various parameters such as an attitude angle and an acceleration. In this embodiment, determining whether there is historical pose data with the deviation from the pose data within the preset range stored in the pose database includes determining whether a deviation of a certain parameter is within a preset range. Taking the attitude angle included in the pose data as an example, it may be determined whether there is a historical attitude angle with a deviation from the attitude angle within a preset range stored in the pose database. It can be understood that this embodiment does not specifically limit the preset range, and different preset ranges may be set according to actual requirements.

In S205, a local 3D grid map is constructed according to the common view frame and the fusion learning model.

Specifically, in this embodiment, constructing the local 3D grid map according to the common view frame and the fusion learning model may include generating a 3D local obstacle map and an obstacle-free map according to the common view frame and the fusion learning model; and constructing the local 3D grid map according to the 3D local obstacle map and the obstacle-free map.

In S206, the second dynamic object filtering is performed on the first image data according to the local 3D grid map to obtain the second image data.

Specifically, in this embodiment, performing the second dynamic object filtering on the first image data according to the local 3D grid map to obtain the second image data may include: determining if, among the first image data, there is an object in the 3D local obstacle map but not in the obstacle-free map; and in response to determining that among the first image data, there is an object in the 3D local obstacle map but not in the obstacle-free map, updating the obstacle-free map, and performing the second dynamic object filtering on the first image data according to an updated obstacle-free map to obtain the second image data. That is, for a certain point in a spatial coordinate, if the point is indicated as an obstacle in the 3D local obstacle map, but is indicated as an accessible region in the obstacle-free map, the point is regarded as a dynamic object, and obstacle information of the point is deleted.

Generally speaking, the operations of 3D dynamic object filtering may be divided into the following steps. At step 1, searching key frame subset S which has a common view with the current frame (i.e., the original image data) from the pose database. At step 2, by using each common view frame in the key frame subset S, generating a 3D local obstacle map $G_O$ and an obstacle-free map $G_f$ by an integer chase algorithm according to the current TSDF model, where, the 3D local obstacle map $G_O$ and the obstacle-free map $G_f$ together constitute a local 3D grid map. At step 3, for a certain point x in the local 3D grid map, if $G_f(x)>0$ and $G_O(x)>0$, it indicates that the point x is an obstacle in the 3D local obstacle map, but the point x is an accessible area in the obstacle-free map. At this time, $G_O(x)$ is set to 0, that is, the obstacle information of this point is deleted. At step 4, image data of the common view frame is updated by using an updated $G_O$; the original image data of the corresponding point is updated, and the TSDF model is updated at the same time by using the updated image data.

Figure 3:
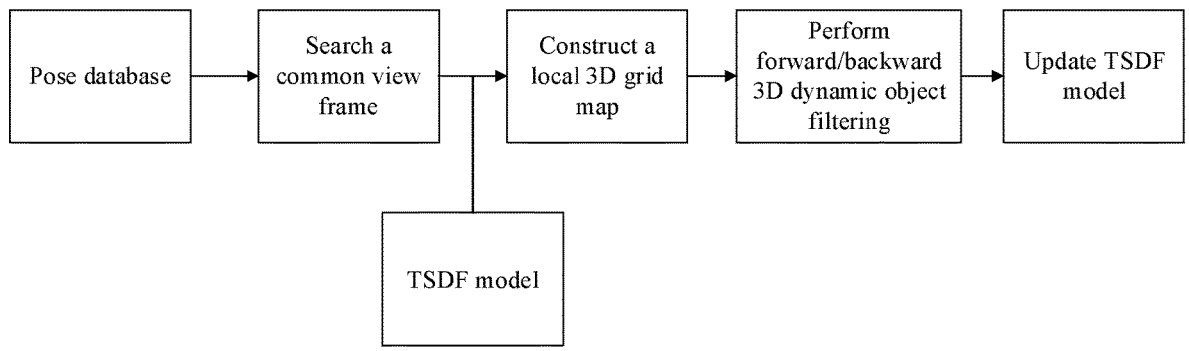
FIG. 3 is a flowchart of dynamic object filtering according to a third embodiment of the present disclosure.

It is worth mentioning that, as shown in FIG. 3, the entire 3D dynamic object filtering is divided into two symmetrical parts: a forward filtering for the current frame and a backward filtering for the previous frame. The essence of the two filtering processes is the same, except that the subjects of the filtering are different. The forward filtering is centered on the current frame, and the image data of the current frame is not fused into the TSDF model. The backward filtering is centered on the previous frame of the current frame: the image data of the current frame is fused into the TSDF model, and at the same time, the previous frame is separated from the TSDF model.

In S207, the fusion learning model is updated according to the second image data to obtain a global learning model.

In S208, the grid map of the original image data is obtained according to the global learning model and the pose data.

With regard to steps S207 to S208, specifically, in this embodiment, obtaining the grid map of the original image data according to the fusion learning model and the pose data may include obtaining a 2D occupancy obstacle map and a 2D obstacle-free map according to the common view frame; and setting all points having obstacles in the 2D occupancy obstacle map to 0, and setting points greater than a preset threshold in the 2D obstacle-free map to 1, so as to obtain the grid map. That is, in the process of generating the grid map, firstly, the 2D occupancy obstacle map and the 2D obstacle-free map are obtained through an optical fiber projection. Then a priority is given to obstacles (in the previous operations, all dynamic objects are filtered out, so there are only dynamic objects in the whole scene). When the 2D occupancy obstacle map of a certain point indicates that there is an obstacle, a final grid state of the point is directly set as an obstacle (set to 0), then the accessible area is determined, and the point greater than the preset threshold in the 2D obstacle-free map is set to 1, so as to obtain the final grid map.

For ease of understanding, the grid map generation method in this embodiment will be described in detail below.

Figure 4:
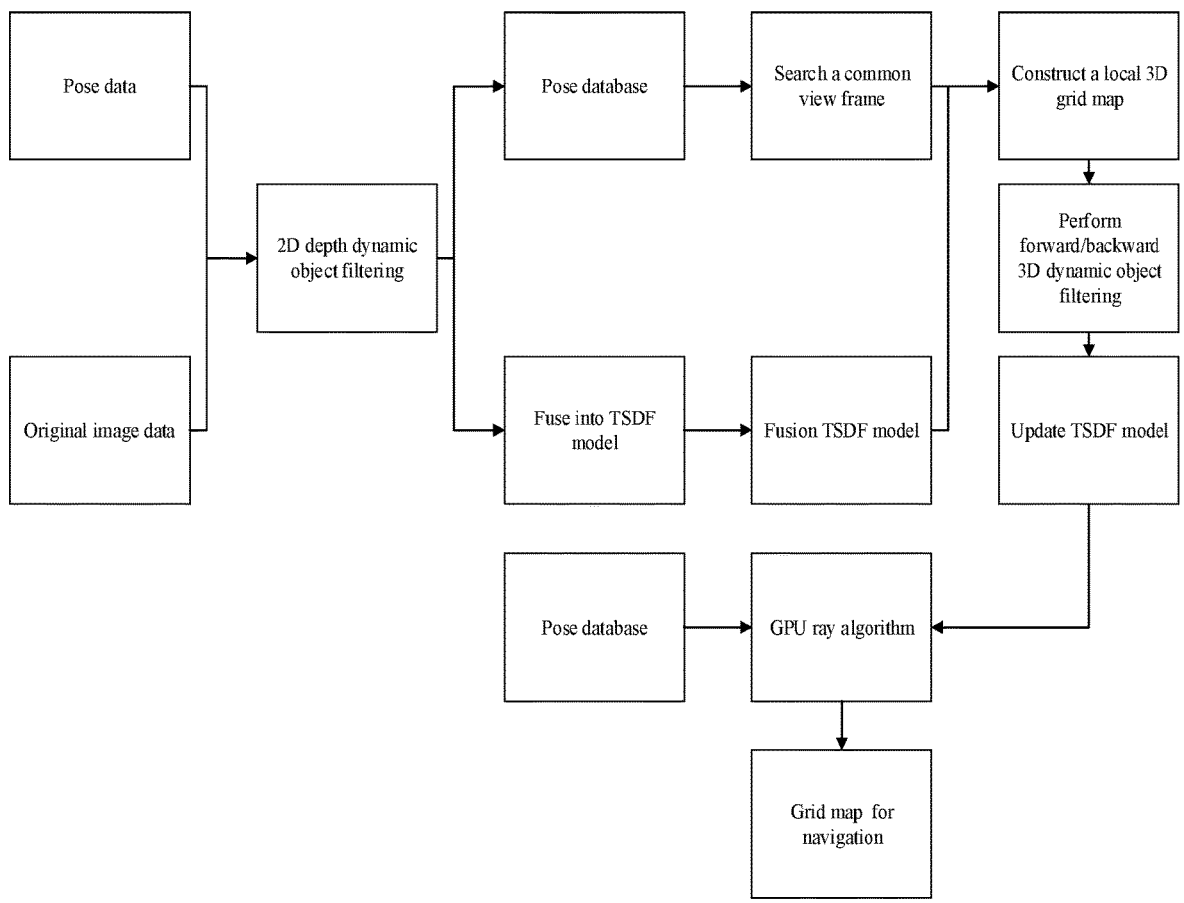
FIG. 4 is another flowchart of a grid map generation method according to a fourth embodiment of the present disclosure.

As shown in FIG. 4, for inputting the pose data and the original image data each time, firstly, the 2D dynamic object filtering is performed on the current original image data by using the existing TSDF model, and then the filtered image in combination with the pose data is fused into the TSDF model to obtain a fusion TSDF model. At the same time, the current pose data is saved in the database, and the frames that have a common view with the current frame are searched in the database, and the local 3D grid map is constructed by using these frames in combination with the TSDF model, so as to filter out the dynamic objects in the map and update the TSDF model accordingly. After obtaining the final TSDF model (i.e. global learning model), the grid map available for navigation is quickly generated by using a designed GPU ray projection algorithm.

It is worth mentioning that in order to generate the grid map, this embodiment may also filter a floor from the TSDF model in advance to prevent the floor from being regarded as an obstacle at last. Since a height from a camera to a chassis in the robot is known, this embodiment uses a distance from the current frame to the chassis as a determination threshold to filter out the floor, thus avoiding the situation that "when a traditional grid map is generated, the ground is regarded as a horizontal plane, so a certain value in a z-direction is directly regarded as the floor, but in actual situation, the floor may not be uniformly parallel to a Z axis, or even there may be a slope, which leads to the inaccuracy of the finally generated grid map", and thus improving the grid map.

The operations and/or steps set in the above-described methods only aim to make the description clearer. In implementation, the operations and/or steps may be combined into one operation and/or step or one operation and/or step may be divided into multiple operations and/or steps, which all fall into the protection scope of the present disclosure as long as the same logical relationship is included. Such a trivial amendment or design added to an algorithm or procedure as not changing the algorithm or a central design of the procedure falls into the protection scope of the disclosure.

Figure 5:
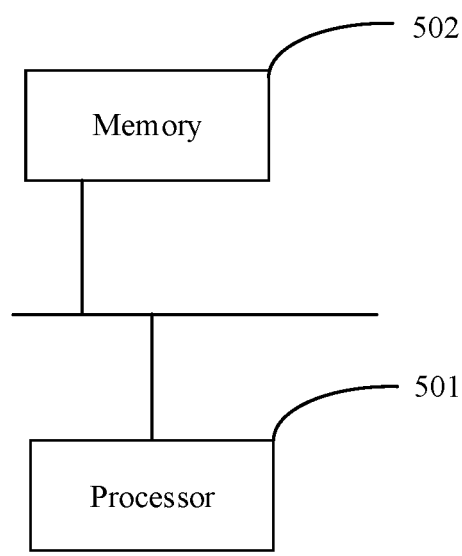
FIG. 5 is a schematic structural diagram of a grid map generation device according to the third embodiment of the present disclosure.

A third embodiment of the present disclosure relates to a grid map generation device, as shown in FIG. 5, including: at least one processor 501; and, a memory 502 communicatively connected with the at least one processor 501; where, the memory 502 stores instructions executable by the at least one processor 501, and the instructions are executed by the at least one processor 501 to cause the at least one processor 501 to execute the above-described grid map generation method.

Herein, the memory 502 and the processor 501 are connected by a bus. The bus may include any number of interconnected buses and bridges, and the bus connects various circuits, such as one or more of the processors 501 and the memory 502. The bus may also connect various other circuits such as a peripheral device, a voltage regulator, a power management circuit, etc., which are well known in the art, and therefore will not be further described herein. A bus interface provides an interface between the bus and a transceiver. The transceiver may be one element or multiple elements, such as multiple receivers and transmitters, providing a unit for communicating with various other devices over a transmission medium. The data processed by the processor 501 is transmitted over a wireless medium via an antenna. In this embodiment, the antenna also receives the data and transmits the data to the processor 501.

The processor 501 is in charge of managing the bus and general processing, and may further provide various functions of, for example, timing, peripheral interface, voltage regulation, power management, and other control functions. The memory 502 may be configured to store the data used by the processor 501 when performing operations.

A fourth embodiment of the present disclosure relates to a computer-readable storage medium storing a computer program. The compute program, when executed by a processor, implements the embodiments of the above-described method.

That is, those skilled in the art may understand that all or some operations that implements the above-described embodiments may be performed by instructing related hardware through a program, where, the program may be stored in a computer-readable storage medium and includes several instructions to enable a device (which may be a single-chip microcomputer, a chip, or the like) or a processor to implement all or part of the operations of the method described in each embodiment of the present disclosure. The aforementioned storage media include a U disk, a mobile hard disk, a read-only memory (ROM), a random-access memory (RAM), a magnetic disk or an optical disk and other medium that may store program codes.

Those skilled in the art would appreciate that the aforementioned embodiments are specific embodiments for implementing the present disclosure. In practice, however, various changes may be made in the forms and details of the specific embodiments without departing from the spirit and scope of the present disclosure.

What is claimed is:

1. A grid map generation method, comprising:
    acquiring original image data of an original image photographed by a photographing device and pose data of the photographing device when photographing the original image;
    inputting the original image data and the pose data into a preset learning model to obtain first image data, wherein the preset learning model performs first dynamic object filtering on the original image data according to the pose data to obtain the first image data;
    fusing the first image data and the pose data into the preset learning model to obtain a fusion learning model; and
    obtaining a grid map of the original image data according to the fusion learning model and the pose data.

2. The grid map generation method according to claim 1, wherein obtaining the grid map of the original image data according to the fusion learning model and the pose data comprises:
    acquiring a common view frame of the original image data from a pose database according to the pose data, wherein the pose database stores historical pose data of the photographing device when photographing historical images;
    constructing a local 3D grid map according to the common view frame and the fusion learning model;
    performing a second dynamic object filtering on the first image data according to the local 3D grid map to obtain second image data;
    updating the fusion learning model according to the second image data to obtain a global learning model; and
    obtaining the grid map of the original image data according to the global learning model and the pose data.

3. The grid map generation method according to claim 2, wherein acquiring the common view frame of the original image data from the pose database according to the pose data comprises:
    determining whether there is historical pose data in the pose database having a deviation from the pose data within a preset range; and
    in response to determining that there is historical pose data in the pose database having the deviation from the pose data within the preset range, using historical image data corresponding to the historical pose data as the common view frame.

4. The grid map generation method according to claim 2, wherein constructing the local 3D grid map according to the common view frame and the fusion learning model comprises:

generating a 3D local obstacle map and an obstacle-free map according to the common view frame and the fusion learning model; and
    constructing the local 3D grid map according to the 3D local obstacle map and the obstacle-free map.

5. The grid map generation method according to claim 4, wherein performing the second dynamic object filtering on the first image data according to the local 3D grid map to obtain the second image data comprises:
    determining if, among the first image data, there is an object in the 3D local obstacle map but not in the obstacle-free map; and
    in response to determining that among the first image data, there is an object in the 3D local obstacle map but not in the obstacle-free map, updating the obstacle-free map, and performing the second dynamic object filtering on the first image data according to an updated obstacle-free map to obtain the second image data.

6. The grid map generation method according to claim 2, wherein obtaining the grid map of the original image data according to the fusion learning model and the pose data comprises:
    obtaining a 2D occupancy obstacle map and a 2D obstacle-free map according to the common view frame; and
    setting all points having obstacles in the 2D occupancy obstacle map to 0, and setting points greater than a preset threshold in the 2D obstacle-free map to 1, so as to obtain the grid map.

7. The grid map generation method according to claim 1, wherein the preset learning model performing the first dynamic object filtering on the original image data according to the pose data comprises:
    for each point in the original image data, acquiring a difference between a SDF value of the point and an original SDF value of a corresponding point stored in the preset learning model;
    binarizing the differences of all points in the original image data to obtain a first mask image; and
    performing the first dynamic object filtering on the original image data according to the first mask image to obtain the first image data.

8. The grid map generation method according to claim 7, wherein performing the first dynamic object filtering on the original image data according to the first mask image to obtain the first image data comprises:
    performing reddish filling on the original image data and the first mask image to obtain a second mask image; and
    performing the first dynamic object filtering on the original image data according to the second mask image to obtain the first image data.

9. A grid map generation device, comprising:
    at least one processor; and
    a memory communicatively connected with the at least one processor; wherein,
    the memory stores instructions executable by the at least one processor, and the instructions are executed by the at least one processor to cause the at least one processor to implement:
    acquiring original image data of an original image photographed by a photographing device and pose data of the photographing device when photographing the original image;
    inputting the original image data and the pose data into a preset learning model to obtain first image data, wherein the preset learning model performs first dynamic object filtering on the original image data according to the pose data to obtain the first image data;
fusing the first image data and the pose data into the preset learning model to obtain a fusion learning model; and
obtaining a grid map of the original image data according to the fusion learning model and the pose data.

10. The grid map generation device according to claim 9, wherein obtaining the grid map of the original image data according to the fusion learning model and the pose data comprises:
acquiring a common view frame of the original image data from a pose database according to the pose data, wherein the pose database stores historical pose data of the photographing device when photographing historical images;
constructing a local 3D grid map according to the common view frame and the fusion learning model;
performing a second dynamic object filtering on the first image data according to the local 3D grid map to obtain second image data;
updating the fusion learning model according to the second image data to obtain a global learning model; and
obtaining the grid map of the original image data according to the global learning model and the pose data.

11. The grid map generation device according to claim 10, wherein acquiring the common view frame of the original image data from the pose database according to the pose data comprises:
determining whether there is historical pose data in the pose database having a deviation from the pose data within a preset range; and
in response to determining that there is historical pose data in the pose database having the deviation from the pose data within the preset range, using historical image data corresponding to the historical pose data as the common view frame.

12. The grid map generation device according to claim 10, wherein constructing the local 3D grid map according to the common view frame and the fusion learning model comprises:
generating a 3D local obstacle map and an obstacle-free map according to the common view frame and the fusion learning model; and
constructing the local 3D grid map according to the 3D local obstacle map and the obstacle-free map.

13. The grid map generation device according to claim 12, wherein performing the second dynamic object filtering on the first image data according to the local 3D grid map to obtain the second image data comprises:
determining if, among the first image data, there is an object in the 3D local obstacle map but not in the obstacle-free map; and
in response to determining that among the first image data, there is an object in the 3D local obstacle map but not in the obstacle-free map, updating the obstacle-free map, and performing the second dynamic object filtering on the first image data according to an updated obstacle-free map to obtain the second image data.

14. The grid map generation device according to claim 10, wherein obtaining the grid map of the original image data according to the fusion learning model and the pose data comprises:
obtaining a 2D occupancy obstacle map and a 2D obstacle-free map according to the common view frame; and setting all points having obstacles in the 2D occupancy obstacle map to 0, and setting points greater than a preset threshold in the 2D obstacle-free map to 1, so as to obtain the grid map.

15. The grid map generation device according to claim 9, wherein the preset learning model performing the first dynamic object filtering on the original image data according to the pose data comprises:
for each point in the original image data, acquiring a difference between a SDF value of the point and an original SDF value of a corresponding point stored in the preset learning model;
binarizing the differences of all points in the original image data to obtain a first mask image; and
performing the first dynamic object filtering on the original image data according to the first mask image to obtain the first image data.

16. The grid map generation device according to claim 15, wherein performing the first dynamic object filtering on the original image data according to the first mask image to obtain the first image data comprises:
performing reddish filling on the original image data and the first mask image to obtain a second mask image; and
performing the first dynamic object filtering on the original image data according to the second mask image to obtain the first image data.

17. A non-transitory computer-readable storage medium storing a computer program, wherein the computer program, when executed by a processor, implements a grid map generation method, the method comprising:
acquiring original image data of an original image photographed by a photographing device and pose data of the photographing device when photographing the original image;
inputting the original image data and the pose data into a preset learning model to obtain first image data, wherein the preset learning model performs first dynamic object filtering on the original image data according to the pose data to obtain the first image data;
fusing the first image data and the pose data into the preset learning model to obtain a fusion learning model; and
obtaining a grid map of the original image data according to the fusion learning model and the pose data.

18. The non-transitory computer-readable storage medium according to claim 17, wherein obtaining the grid map of the original image data according to the fusion learning model and the pose data comprises:
acquiring a common view frame of the original image data from a pose database according to the pose data, wherein the pose database stores historical pose data of the photographing device when photographing historical images;
constructing a local 3D grid map according to the common view frame and the fusion learning model;
performing a second dynamic object filtering on the first image data according to the local 3D grid map to obtain second image data;
updating the fusion learning model according to the second image data to obtain a global learning model; and
obtaining the grid map of the original image data according to the global learning model and the pose data.

19. The non-transitory computer-readable storage medium according to claim 18, wherein acquiring the common view frame of the original image data from the pose database according to the pose data comprises:

determining whether there is historical pose data in the pose database having a deviation from the pose data within a preset range; and in response to determining that there is historical pose data in the pose database having the deviation from the pose data within the preset range, using historical image data corresponding to the historical pose data as the common view frame.

20. The non-transitory computer-readable storage medium according to claim 18, wherein constructing the local 3D grid map according to the common view frame and the fusion learning model comprises:

generating a 3D local obstacle map and an obstacle-free map according to the common view frame and the fusion learning model; and constructing the local 3D grid map according to the 3D local obstacle map and the obstacle-free map.

* * * * *